United States Patent [19]

Balstad

[11] Patent Number: 4,967,979
[45] Date of Patent: Nov. 6, 1990

[54] COMMAND GUIDANCE TECHNIQUE FOR LINE-OF-SIGHT MISSILE

[75] Inventor: Jon O. Balstad, China Lake, Calif.

[73] Assignee: The United States of America as represented by the Secretary of the Navy, Washington, D.C.

[21] Appl. No.: 398,295

[22] Filed: Sep. 21, 1973

[51] Int. Cl.$^5$ .............................................. F41G 7/30
[52] U.S. Cl. .................................................. 244/3.11
[58] Field of Search ................... 244/3.11, 3.13, 3.15, 244/3.16, 3.17

[56] References Cited

U.S. PATENT DOCUMENTS

| | | | |
|---|---|---|---|
| 2,404,942 | 7/1946 | Bedford | 244/3.13 |
| 2,930,894 | 3/1960 | Bozeman | 244/3.13 |
| 3,398,918 | 8/1968 | Girault | 244/3.13 |
| 3,782,667 | 1/1974 | Miller, Jr. et al. | 244/3.13 |

Primary Examiner—Charles T. Jordan
Attorney, Agent, or Firm—William C. Townsend; Melvin J. Sliwka

[57] ABSTRACT

A line of sight missile system wherein the missile includes a beacon and a receiver, and the control station includes a telescope and a four-quadrant, polarizing encoder. The telescope is sighted on a target by the operator, the illumination from the beacon passes through the encoder and is reflected back to the receiver. The signal received by the receiver is processed within the missile and provides flight control instruction.

10 Claims, 1 Drawing Sheet

COMMAND GUIDANCE TECHNIQUE FOR LINE-OF-SIGHT MISSILE

BACKGROUND OF THE INVENTION

1. Field of the Invention

This invention pertains to command guidance systems for line-of-sight missiles.

The present invention provides for a reduction in cost, weight and size for currently operational antitank line-of-sight missile systems. This is accomplished by removing the mechanical data link (wire) that connects the launcher and missile, in most of the present systems. This eliminates the wire-snagging problem in low-level helicopter launch and the wire-shortage problem in over-water launch. The present invention also gives line-of-sight missile systems a better resistance to jamming.

The present invention also provides the missile controller/ launcher with a viewing subsystem for night operation which is fully integrated with the guidance system. The present invention allows the missile to roll naturally and putting roll-tracking at the launcher, thereby eliminating costly missile-borne gyros, etc. The present invention accomplishes all of the guidance and viewing in a manner that avoids a detectable level or irradiation at the target and thus denies the target a fore-warning that it is under attack.

SUMMARY OF THE NEW INVENTION

A line of sight missile system wherein the missile includes a beacon and a receiver, and the control station includes a telescope and a four-quadrant, polarizing encoder. The telescope is sighted on the target by the operator, the illumination from the beacon passses through the encoder and is reflected back to the receiver. The signal received by the receiver is processed within the missile and provides flight control instruction.

DETAILED DESCRIPTION OF THE INVENTION

The operating principle is generally described as follows: (a) the operator views the target through an aiming telescope and puts the system line-of-sight (as defined cross-hairs) on the target. (b) The missile is launched and the radiation from one or more beacons is acceptd by the control telescope and brought to focus at a reflective encoding surface. (c) The encoder (such as spinning reticle with reflective elements, an array of reflective polarizes, etc.) operates on each beacon image in a manner that imposes on the reflected flux information about the image position. (d) The reflected beacon radiation is reimaged back upon each beacon by the control telescope in accordance with the autocollimation principle. (e) A receiver is situated on the missile adjacent to (or coaxial to) each beacon and looks rearward to detect the reimaged flux and formulates error signals proportional to distance of the missile from the line-of-sight missile. (f) The appropriate steering commands direct the missile down the line-of-sight until impact.

Figure 1:
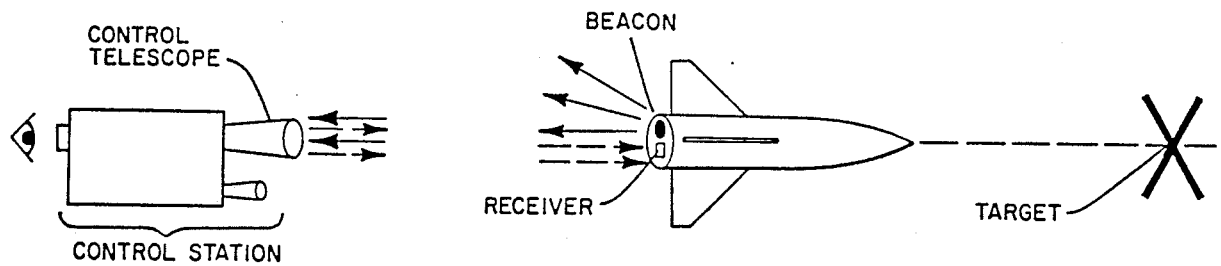
FIG. 1. shows a schematic operation of the invention.
Figure 2:
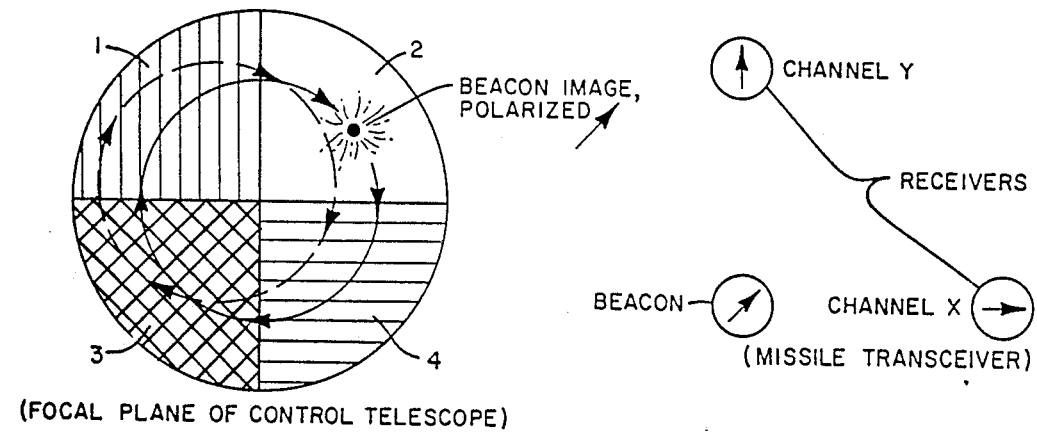
FIG. 2. shows a schematic of the control station.

A specific version of the invented system is one that utilizes a single beacon/receiver set (transceiver) situated on the missile axis. An on-axis transceiver can be accomodated by the use of dual rocket nozzels situated one on each side of the transceiver and aimed outward to keep the missile plume out of the line-of-sight (as is the case with some existing missiles). To begin with this concept, let us first assume that the missile body is not free to roll. The beacon is a pulsed solid state laser diode or some other polarized source. In FIG. 2 the beacon image is shown focused upon a four-quadrant encoders in the focal plane of the control telescope. The beacon is purposely oriented on the missile airframe to yeild the 45° polarization direction indicated for its image.

The reflective feature of the encoder is provided by a single first-surfaced mirror or other suitable reflecting material situated in the focal plane. The four unique quadrants are then defined on this surface. Quadrants 1 and 4 are formed by affixing ordinary plastic polarizers (or the equivalent) to the reflective surface with the polarizing direction vertical in quadrant 1 and orthogonal to that in quadrant 4. Quadrant 3 is coated with a nonreflective diffuse black material and quadrant 2 is simply the untreated mirror surface.

The control telescope is equipped with optics to provide a conical scan. This scan motion nutates the telescope image (or the encoder itself) and avoids rotation so as to preserve unamambiguous up-down, right-left, directions. The result is a circular trajectory for the beacon image across the quadrant encoder for any given scan cycle. If the missile is on the telescope line-of-sight, then this scan circle is concentric with the quadrant axis and the image dwells the same time on each quadrant. If the missile is off course, then the scan circle is not centered, as shown with the dashed line, but the circle diameter remains unchanged (except with range). In this case the dwell time is different for each quadrant. It is essentially a measurement of time which allows the missile receiver to determine error.

The missile receiver is actually a dual-channel device, with a sensor channel for each of the orthogonal polarization directions also shown in FIG. 2. The receiver uses a single objective lens for flux collection, but separates the two channels with a polarizing beamsplitter or the equivalent. A spectral filter matched to the beacon emission is installed in the receiver to minimize system noise and a field stop situated in each channel defines the rearward-looking field-of-view.

Figure 3:
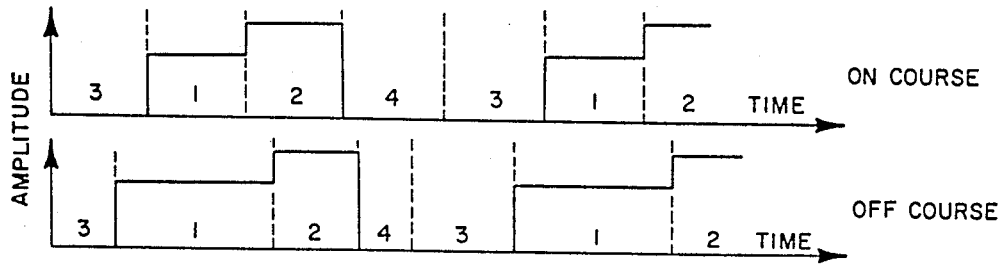
FIG. 3. shows a signal format in the Y channel of the missile receiver.

Receiver channel Y is solely responsible for elevation control of the missile and thus relates itself only to the horizontal control fins. FIG. 3 shows the time dependence of the signal in this channel for both the on and off-course cases shown in FIG. 2. With the on-course case it is evident that no signal is received when the beacon image is in quadrant 3 because the encoder is nonreflecting in this area. After the image passes the quarant-three-quadrant-four border the polarizer absorbs the horizontal component of the beacon flux, but allows the vertical component to reflect and be received in channel Y. This reflection continues and climbs to a higher level as the image escapes the polarizer losses (in the polarizing direction) in passing to the open mirror surface in quadrant 2. Finally, the received flux terminates as the image enters quadrant 4 because then, of course, the reflected flux becomes polarized normal to the channel Y direction.

The amplitude chang ein the signal at the quadrant-one-quadrant-two border is ignored by the receiver (and, in fact, could be avoided entirely by reducing the reflectance of quadrant 2). With this on-course case the signal duration for quadrants 1 and 2 is equal to the no-signal duration for quadrants 3 and 4 and channel Y interprets the up-down position to be correct. For the off-course case in FIG. 3 the nutation center has risen above the horizontal quadrant axis and on-time of the signal is thereby too great. This time increase indicates to channel Y that the missile is too low (because, of course, the telescope image is always inverted). The percent increase indicates the degree of error and thus may be used to determine the proportional amount of horizontal fin deflection which will serve best to correct the missile course without oscillation about the line-of-sight. Another off-course situation not shown waith the missile too high is denoted by too little signal time (or the ratio of on to off time is less than unity) and this implies that reverse fin control is to be applied.

Azimuth control for the missile is accomplished in a parallel manner using the same telescope and encoder, but by sensing radiation in the orthogonal X channel. It is evident from FIG. 2 that the signal on/off time ratio is not affected in channel Y by any amount of azimuth error and the symmetrical situation exists for channel X. The X and Y control loops are independent as indeed they must be.

MISSILE ROLL COMPENSATION

Some line-of-sight missiles employ a controlled spin for trajectory stabilization while others depend upon an autopilot to eliminate roll and stabilize pitch and yaw. It is the latter type which are adaptable to the guidance device thus far described. It appears that production cost per round would be lower with the spinstabilized approach because the costly gyros, accelerometers, etc., of the autopilot may be eliminated. If guidance error considerations also justify the spinning airframe, then the missile control telescope must be designed with a roll-tracking capability or alternately the missile must determine its own roll state with some sort of interial sensor to properly interpret azimuth/elevation commands from the telescope so that deflection is applied to the proper fins.

Figure 4:
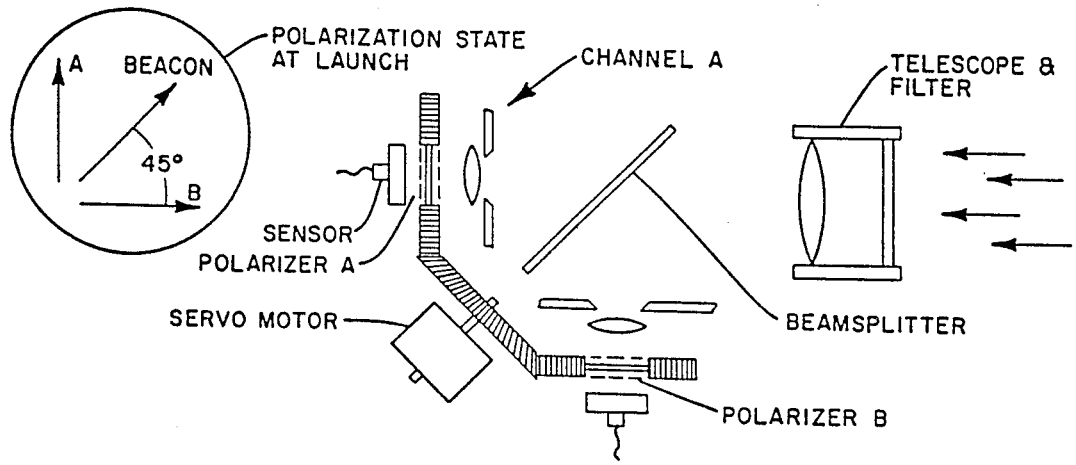
FIG. 4. shows the roll tracker for the control telescope.

The present invention includes a roll tracker (FIG. 4) for the control telescope which again incorporates the polarized property of the missile beacon flux. The tracker is integrated with the body of the control telescope and incorporates a second small telescope, a spectral filter matched to the beacon spectrum, a polarization-free beamsplitter, two field lenses, two polarizers (or analyzers), two sensors, a servo motor and associated electronics. A field stop is placed in each of the sensor channels A and B to define a field including the line-of-sight and each field lens images the telescope entrance aperature upon a sensor. Each of the polarizers is mounted so as to be free to rotate when driven by the servo motor. This motor is geared to the polarizers in a manner that maintains the polarization directions orthogonal to one another (as seen looking into the telescope) and maintains the beacon at its polarization launch state.

What is claimed is:

1. A line-of-sight missile guidance system for a guided missile comprising:
   (a) beacon and a receiver located on the missile;
   (b) a control station comprising:
      a control telescope; and
      a four quadrant, polarizing encoder; whereby when the telescope is sighted on a target by a control station operator the illumination from the beacon passes through the encoder and is reflected back to the receiver whereupon it is processed to provide flight control instruction.

2. The device of claim 1 wherein:
the encoder surface is situated in the focal plane of the telescope.

3. The device of claim 2 wherein:
said encoder is divided into first, second, third and fourth quadrants; and
the beacon is situated on the missile airframe to yield a 45° from vertical polarization direction.

4. The device of claim 3 wherein:
the first quadrant comprises reflective means for providing a vertical polarizing direction;
the fourth quadrant comprises reflective means for providing a horizontal polarizing direction;
the second quadrant is a mirror surface; and
the third quadrant is a nonreflective surface.

5. The device of claim 2 comprising:
means for nutating the telescope image with respect to the encoder surface.

6. The device of claim 1 comprising:
means for compensating for missile roll.

7. The device of claim 6 comprising:
the compensating means being situated in the body of the telescope;
a second telescope; a spectral filter matched to the beacon spectrum;
a polarization-free beamsplitter:
   the second telescope being situated between the filter and the beamsplitter; and
   the filter, the second telescope and the beamsplitter all being situated on the optic path of the beacon.

8. The device of claim 7 comprising:
the optic path from the beamsplitter passing respectively through a pair of orthogonally situated field stops, field lenses, polarizers and sensors;
the polarizers being rotatable and geared to a servo motor; and
the gearing of the pair of polarizers being identical so that their polarization directions remain orthogonal to each other.

9. The device of claim 4 comprising:
means for measuring the dwell time within each quadrant.

10. The device of claim 9 wherein the receiver comprises:
a dual-channel device with a sensor channel for each of the orthogonal polarization directions.

* * * * *